United States Patent
Mies et al.

[11] Patent Number: 5,818,540
[45] Date of Patent: Oct. 6, 1998

[54] INSTALLATION AND METHOD FOR FREEZING AUDIOVISUAL DATASTREAMS

[75] Inventors: Ronald Johannes Maria Mies, Leidschendam; Frederik Harm Klok, Rijswijk, both of Netherlands

[73] Assignee: Koninklijke PTT Nederland N.V., The Hague, Netherlands

[21] Appl. No.: 687,991

[22] Filed: Jul. 29, 1996

[30] Foreign Application Priority Data

Jul. 27, 1995 [NL] Netherlands .......................... 1000894

[51] Int. Cl.⁶ .......................... H04N 7/173; H04N 5/14; H04N 5/22
[52] U.S. Cl. .................. 348/559; 348/7; 348/12; 348/13; 455/4.2; 455/5.1
[58] Field of Search ................... 348/559, 7, 12, 348/13, 10; 455/4.2, 5.1, 6.3, 6.2; 386/8, 68, 81–82; H04N 7/173, 5/14, 5/22

[56] References Cited

U.S. PATENT DOCUMENTS

| | | | |
|---|---|---|---|
| 4,272,787 | 6/1981 | Michael et al. | 348/559 |
| 5,357,276 | 10/1994 | Banker et al. | 348/7 |
| 5,371,532 | 12/1994 | Gelman et al. | |
| 5,446,490 | 8/1995 | Blahut et al. | 348/7 |
| 5,519,448 | 5/1996 | Nagasawa et al. | 348/559 |
| 5,592,299 | 1/1997 | Boyce et al. | 386/68 |
| 5,636,315 | 6/1997 | Sugiyama et al. | 386/46 |

FOREIGN PATENT DOCUMENTS

| | | | |
|---|---|---|---|
| 0 594 350 | 4/1994 | European Pat. Off. | H04N 6/173 |
| 0 633 694 | 1/1995 | European Pat. Off. | H04N 7/173 |

*Primary Examiner*—Glenton B. Burgess
*Attorney, Agent, or Firm*—Young & Thompson

[57] ABSTRACT

Installation and method for freezing audiovisual data streams, which installation comprises a video freeze control (2) which is equipped to receive a freeze command signal (FR) to be generated by a user and to detect a predetermined marker in a videosignal read from a memory (1), and, after receipt of the freeze command signal and detection of the marker, to supply a video control signal (VSC) for a video switch (4) and a video stop signal (VS) to interrupt reading of the video signal (VID), which video switch comprises a first input, to which the video signal (VID) read out is fed, and a second input, which is connected to a video stuffing generator which generates a video stuffing signal (VIDSTUFF), wherein the video switch (4) connects its output to the second input if this receives the video control signal (VSC) and otherwise connects its output to the first input; at the point in time when reading of the video signal is interrupted, reading of an associated audio signal (AUD), if applicable, is also interrupted.

15 Claims, 3 Drawing Sheets

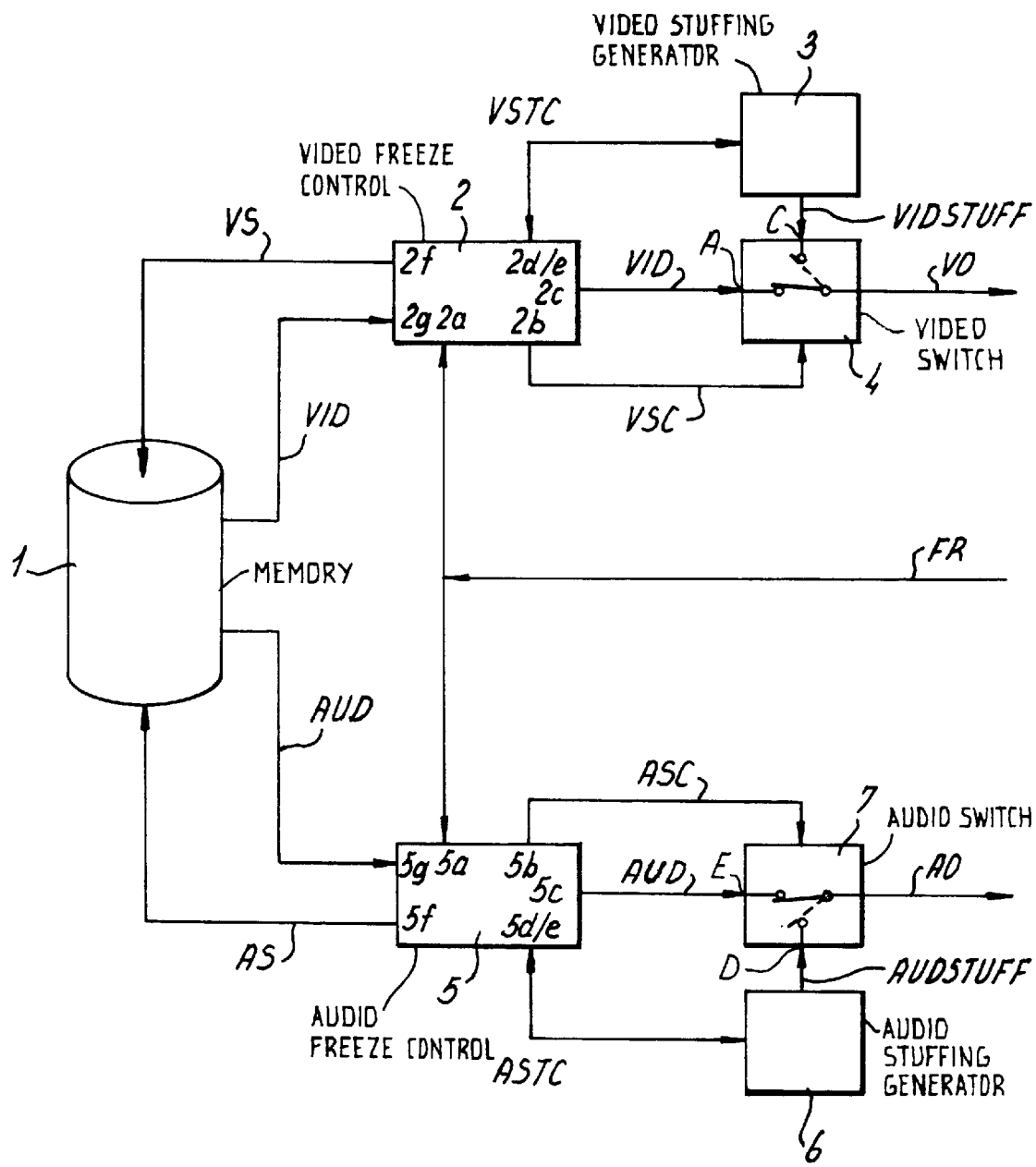

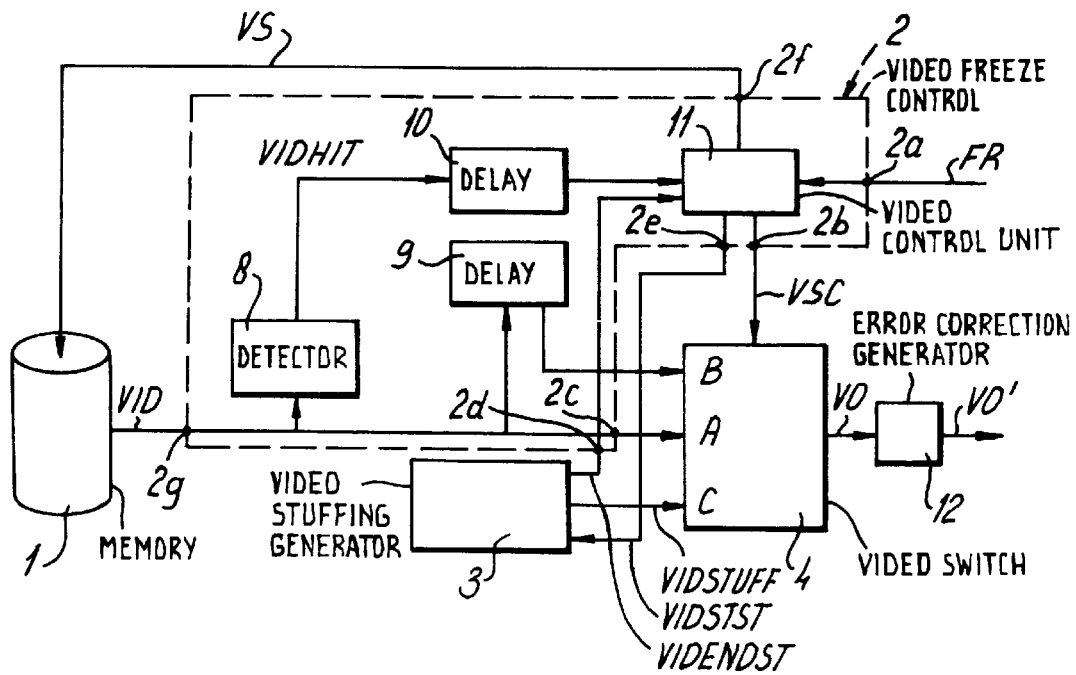
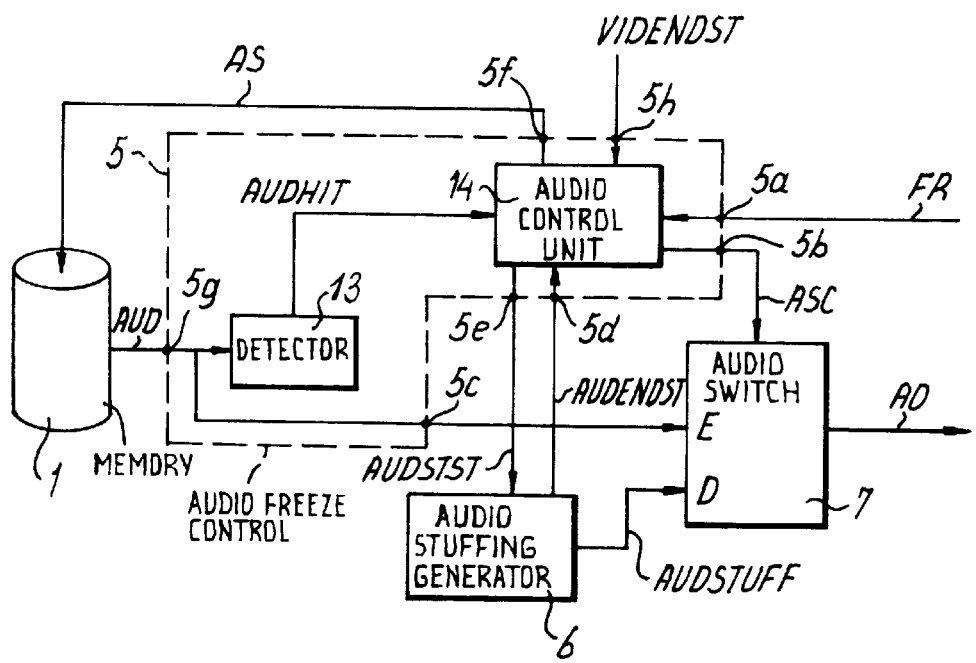

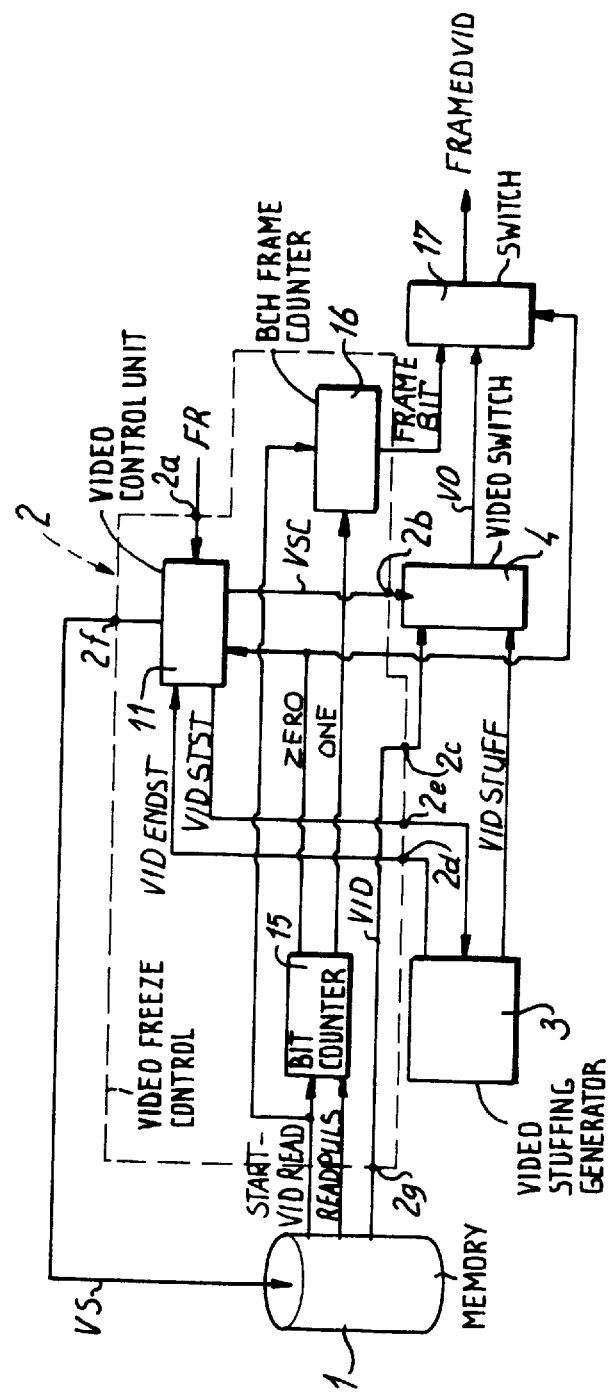

INSTALLATION AND METHOD FOR FREEZING AUDIOVISUAL DATASTREAMS

BACKGROUND OF THE INVENTION

The present invention relates to an installation for freezing an audiovisual data stream, comprising means for generating a video stuffing signal and a video freeze control provided with at least a first video input for receiving a freeze command signal and with a video output for supplying a video stop signal to stop the reading of a video signal from a memory at a predetermined point in time, after the freeze command signal has been received.

An installation of this type is disclosed in EP-A-0,633,694.

An other installation for freezing audiovisual data streams is known from U.S. Pat. No. 5,317,399. The known installation comprises a receiver for receiving HDTV (High Definition Television) video images and means for freezing an image displayed via a monitor. The means comprise a freeze switch, to be operated by the user, and a video freeze control which, after the freeze switch has been closed, activates a frame memory control unit such that the latter continues to display an image stored in a frame memory continuously on the monitor. A special characteristic of the known installation is that the installation is equipped such that as soon as the freeze switch is opened again the frozen image displayed continues to be displayed until such time as a subsequent complete image for the relevant frame memory is ready for saving in the frame memory.

A prominent disadvantage of the known installation in that the means for freezing an image are arranged on the receiver side, so that, firstly, every receiver has to be equipped individually with such means and, secondly, the transmission of video images is not interrupted when an image is frozen, and, therefore, images transmitted during freezing are lost to the user.

These latter disadvantages are solved by the installation disclosed in EP-A-0,633,694 referred to above.

This document relates to the transmission of video images stored in a central memory to one or more remote users. The known installation offers the possibility of real-time interactive video-like control of such video images remotely stored. The centrally located part of the known installation comprises a library server storing one or more video tapes. The library server is connected both to a video server and a gateway server. The gateway server is connected to several user stations via a bidirectional telecommunication connection through a network. The gateway server provides control signals both to the video server and the library server and a server segment cache. The server segment cache is intended for local storage of those parts of the video tapes which are to be transmitted to the several user stations through the network.

Any user of the known installation can transmit commands of different types to the gateway server, like reverse, forward and pause. The known installation offers the possibility of using filler bits produced by a packet filler whenever no video signal bits are available.

In the known installation, the server segment cache comprises a memory block for storing one or more cache memory blocks. The memory block is filled by means of a fill-pointer to store parts of the video tapes. Play-pointers are used to read out these stored parts of the video tapes. The play-pointers are designed such that they can never outrun the fill-pointer. The gateway server provides a suitable control signal to the server segment cache in dependence on the command signal issued by the user. The control signal to the server segment cache is used by the server segment cache for reading the memory block by means of the play-pointers. By controlling the play-pointers the functions reverse, forward and pause are implemented.

However, in the known installation no facility is provided to interrupt a video image at a well-determined point of time. After the server segment cache has interrupted playback of the video tape, and after receiving a command to restart playback of the video tape, sometimes, e.g. when using H.320 terminals, the video and its corresponding sound will have lost synchronization at the receiving side.

SUMMARY OF THE INVENTION

An object of the invention is to provide an installation for freezing audiovisual data streams at well defined stop positions within the video signal and the audio signal such that after freezing these signals well defined start positions are present.

Therefore, an installation of the type mentioned in the preamble is characterised by the video freeze control being provided with means to detect predetermined markers in the video signal and to supply a corresponding video control signal whenever such a marker has been detected, and by controllable video switching means provided with at least a first video switch input for receiving the video stuffing signal, a second video switch input for receiving the video signal read from the memory, a video control input for receiving the video control signal and a video switch output for supplying a video output signal, which video switching means are equipped to connect the video switch output to either the first video switch input or the second video switch input depending on the video control signal.

With this arrangement audio freeze means for generating an audio stop signal in synchronisation with the video stop signal can be provided.

An installation of this type for freezing audiovisual data streams has the advantage that the installation has to be set up only on the transmission side. A further advantage of this installation for freezing audiovisual data streams is that, at the point in time when a freeze command signal is given by a user, the installation can stop the reading of a video signal at a suitable point in time (for example at the end of a complete video image), so that no new video images are transmitted during freezing of the last video image transmitted and, therefore, no video images are lost to the user. After reading of new video images from the memory has been stopped, a video stuffing signal is transmitted until the request to freeze a video image is terminated. At the point in time that the image is frozen, the audio signal associated with the video signal is also stopped, if applicable, so that when the freeze command signal is interrupted again, both new video images and, where appropriate, associated audio signals can be read at the point where reading of the frozen video image was stopped. Furthermore, the installation according to the invention is simple and inexpensive to implement.

Usually, a video signal is transmitted as a serial bit stream, marker signals being located between successive video images or within video images. Marker signals of this type can be used to detect the separation line between successive complete video images or within complete video images and thus to stop the reading of video images between two successive video images in or within a video image, so that the generation of a freeze command signal does not lead to freezing of an incomplete video image.

In a first embodiment the invention relates to an installation for freezing audiovisual data streams, wherein the video signal is compiled as a serial bit stream and the video freeze control is also provided with:

a second video input for receiving the video signal compiled as a serial bit stream, a video detector connected to the second video input for detecting the markers an predetermined video bit patterns in the video signal and supplying a video detector output signal after any of the video patterns has been detected, and a video control unit equipped to receive the freeze command signal and the video detector output signal and to supply the video control signal depending on the freeze command signal and the video detector output signal.

The audio freeze means in the installation according to the invention can, for example, comprise:

an audio freeze control provided with a first audio input for receiving the freeze command signal, at least a first audio output for supplying an audio control signal, a second audio output for supplying an audio stop signal to stop the reading of an audio signal from the memory at a predetermined point in time, after the freeze command signal has been received;

means for generating an audio stuffing signal;

controllable audio switching means provided with at least a first audio switch input for receiving the audio stuffing signal, a second audio switch input for receiving the audio signal read from the memory, an audio control input for receiving the the audio control signal and an audio switch output for supplying an audio output signal, which audio switching means are equipped to connect the audio switch output with the first or second audio switch input depending on the audio control signal.

Audio freeze means of this type are simple and inexpensive to implement.

As long as the freeze command signal is active, the installation for freezing audiovisual data streams will thus transmit a video stuffing signal and, if applicable, an audio stuffing signal, which signals can be produced using conventional means available on the market and which, at the receiver side, will be interpreted as supplementary information between successive video images and audio signals and not as valid video and sound Information. They automatically lead to freezing of the last valid video image transmitted.

Preferably, the audio signal is likewise compiled as a serial bit stream and the audio freeze control is also provided with:

a second audio input for receiving the audio signal compiled as a serial bit stream, an audio detector connected to the second audio input for detecting a predetermined audio bit pattern in the audio signal and supplying an audio detector output signal after the audio bit pattern has been detected, and an audio control unit equipped to receive the freeze command signal and the audio detector output signal and to supply the audio control signal depending on the freeze command signal and the audio detector output signal.

Thus, seen overall, an audio freeze control of this type has the same structure as the abovementioned video freeze control and can be implemented simply using elements available on the market.

Frequently, the bit stream of the audio signal is built up from 8-bit bytes, so that the audio detector can then be simply a counter for counting 8 successive bits.

In a second embodiment, the invention relates to an installation wherein the video signal is saved in the memory as a serial bit stream with BCH error correction code and wherein the means to detect predetermined markers in the video signal comprise a bit counter connected to the memory for supplying a detection signal when a now BCH frame is read, and a video control unit equipped to receive the freeze command signal and the detection signal, to supply the video control signal depending on the freeze command signal and the detection signal.

The invention also relates to a method for freezing an audiovisual data stream comprising at least a video signal read from a memory, comprising the following steps:

a. generation of a freeze command signal;

b. stopping reading of the video signal from the memory in dependence on the freeze command signal and supplying a video stuffing signal from that point in time;

characterised in that step b comprises the following substeps:

b1. detection of a predetermined marker in a video signal read from a memory;

b2. supply of a video detector output signal as soon as the marker has been detected;

b3. stopping reading of the video signal from the memory as soon as both the freeze command signal and the video detector output signal have been generated and generation of a video stuffing signal from that point in time.

A method of this type for freezing an audiovisual data stream can be expanded by the following steps:

c. detection of a predetermined audio bit pattern in an audio signal read from the memory, after the freeze command signal has been generated in step a;

d. supply of an audio detector output signal as soon as the audio bit pattern has been detected;

e. stopping the reading of the audio signal from the memory an soon as both the freeze command signal and the audio detector output signal have been generated and generation of an audio stuffing signal from that point in time.

The invention will be explained below with reference to a few drawings, in which a preferred embodiment of the present invention is illustrated.

BRIEF DESCRIPTION OF THE DRAWINGS

FIG. 1 shows a block diagram of an installation for freezing audiovisual data streams in accordance with the invention;

FIG. 2 shows a block diagram of an installation for interrupting the reading and transmission of new video images at the point in time when a freeze command signal has been generated;

FIG. 3 shows a block diagram of an installation for interrupting the reading of an audio signal associated with the video images at the point in time when the freeze command signal has been generated;

FIG. 4 shows an alternative for the installation shown in FIG. 2.

DESCRIPTION OF THE PREFERRED EMBODIMENTS

The installation for freezing audiovisual data streams in accordance with the invention is shown diagrammatically in FIG. 1 and comprises a video freeze control 2, which has a video input 2a for receiving a freeze command signal FR. The video freeze control 2 also has a video output 2b for supplying a video control signal VSC. The video control signal VSC is fed to a controllable video switch 4. The video freeze control 2 is also provided with a video input 2g for receiving a video signal VID read from a memory 1. Via a video output 2f, the video freeze control 2 is able to generate a video stop signal VS which is fed to the memory 1. Via a video output 2c, the video signal VID, in unmodified or modified form, is fed to an input A of the video switch 4.

The memory 1 can be any suitable storage medium, such as ROM, RAM, a hard disk, CD-ROM, etc.

A video stuffing generator 3 is present to generate a video stuffing signal VIDSTUFF. The video stuffing signal VID-STUFF is fed to a further input C of the video switch 4. A (bidirectional) communication line is optionally arranged between the video freeze control 2 and the video stuffing generator 3 to transmit video stuffing control signals VSTC. A communication line of this type is then connected to an input/output 2d/e of the video control. The video stuffing generator 3 can be implemented using simple means available on the market. The video stuffing generator 3 can, for example, be implemented with the aid of a BCH coding unit or a VLC coding unit organised in accordance with the H.261 standard. The VIDSTUFF signal generated by this means has a predetermined pattern which at the receiver side will be interpreted as supplementary information between successive video images. It will not be interpreted as information which has to be displayed with a subsequent video image.

Depending on the value of the video control signal VSC, the video switch 4 will connect the output thereof to either the video signal VID or the video stuffing signal VIDSTUFF.

The installation shown also comprises an audio freeze control 5, which is provided with an audio input 5a for receiving the freeze command signal FR. The audio freeze control 5 also has an audio output 5b for supplying an audio control signal, which is fed to a controllable audio switch 7. The audio freeze control 5 has an audio output 5f for supplying an audio stop signal AS, which is fed to the memory 1 to stop the reading of an audio signal AUD at a predetermined point in time after the freeze command signal FR has been received. This will be considered in more detail when discussing FIG. 3. Via an audio input 5g, the audio freeze control 5 is connected to the memory 1 to receive the audio signal AUD read from the memory 1. Via an audio output 5c, the audio freeze control 5 supplies, in unmodified or modified form, the audio signal AUD which has been read to an input E of the audio switch 7.

An audio stuffing generator 6 is provided to generate an audio stuffing signal AUDSTUFF which is directed to a further input D of the audio switch 7. Depending on the value of the audio control signal ASC, the audio switch 7 switches between the two input signals AUD and AUD-STUFF. The audio switch supplies an audio output signal AO, whilst the video switch 4 supplies a video output signal VO.

The audio stuffing generator 6 can be implemented using simple means readily available on the market which generate a predetermined stuffing signal, which at the receiver side will be interpreted as supplementary information between successive packets of sound information to be produced and will not be interpreted as sound information to be produced (in other words, the audio stuffing signal corresponds to sound volume 0).

If desired, a bidirectional communication link can be provided between the audio freeze control 5 and the audio stuffing generator 6 to transmit suitable audio stuffing control signals ASTC. A communication link of this type is then connected to input/output 5d/e of the audio freeze control 5.

It Is self-evident that the audio freeze means 5, 6, 7 will be absent in applications which relate solely to video.

The installation according to FIG. 1 is suitable for providing so-called "retrieval" services which, for example, can be contacted by audiovisual terminals via ISDN, e.g. by H.320 terminals. The memory 1 contains, for example, audiovisual data in which coded audio bit streams AUD and video bit streams VID are saved. A user at a receiving terminal (not shown) can, for example via an ISDN telephone line, make use of said services and select the information in the memory 1 which he or she desires. After a specific selection has been made, the saved, coded audio bit streams and video bit streams are transmitted to the terminal, where the bit streams are decoded again. The video images are made visible on a monitor (not shown) whilst the associated audio information is audible.

The installation according to FIG. 1 is suitable for freezing a specific desired video image at a point in time to be determined by the user. To this end the user generates the freeze command signal FR. This can be effected, for example, by means of a switch specifically equipped for this purpose (not shown). In that case the freeze command signal FR corresponds, for example, to a predefined voltage level. As an alternative, the freeze command signal FR can also comprise a predetermined bit pattern from a serial bit stream. A bit pattern of this type can form part of the commands transmitted by the terminal to the relevant "retrieval" service.

Both the video freeze control 2 and the audio freeze control 5 receive the freeze command signal FR. The video freest control 2 monitors the video signal VID received and preferably detects a suitable point in time at which the transmission of the video signal VID can be interrupted. In principle, this can be effected in two ways. The first way can be termed MBA stuffing, whilst the second way can be termed BCH stuffing. In the case of MBA stuffing the transmission of video images is interrupted between two complete video images in or within a video image. In the case of BCH stuffing, however, the transmission of video images is interrupted at a predetermined, well defined point in time within a video image. MBA stuffing is based an the insight that each new part of a video image starts with a predefined start code, for example consisting of twenty bits, sixteen of which are fixed and four of which indicate a specific number. Detection of such a start code can then be used to interrupt the transmission of video images between two video images in or within a video image. This will be explained in more detail with reference to FIG. 2.

BCH stuffing is based on the interruption of the transmission of video images after a predetermined number of bits from the start of a video bit stream, for example an integer times 512 bits. Such series of 512 bits are coupled in a conventional manner to the supply of error correction codes, which can also serve as markers. This will be explained in more detail with reference to FIG. 4.

As soon as the video freeze control 2 has detected such a well-defined marker in the video signal VID, the video freeze control 2 transmits the video control signal VSC to the video switch 4, the result of which is that the output of the video switch 4 is coupled to the input of the video switch 4 at which the video stuffing signal VIDSTUFF from the video stuffing generator 3 is present. At the same point in time the video freeze control 2 transmits the video stop signal VS to the memory 1 to interrupt reading of the video signal VID.

If the bidirectional communication line is present between the video freeze control 2 and the video stuffing generator 3, the video stuffing generator 3 can be switched on with the aid of suitable video stuffing control signals VSTC at the point in time when the video stuffing signal VIDSTUFF is needed. It is conceivable that said bidirectional link is dispensed with and the video stuffing generator 3 is equipped to supply such an output signal continuously. In this latter case, the process of reading video images must, however, be synchronised with the video stuffing generator 3.

After the audio freeze control 5 has received a freeze command signal FR it waits until a predetermined audio bit pattern has been detected in the audio signal AUD, which indicates a suitable point in time for interrupting reading of the audio signal AUD. As soon as said suitable audio bit pattern has been detected, the audio freeze control 5 generates the audio control signal ASC so that the output of the audio switch 7 is connected to the input at which the audio stuffing signal AUDSTUFF is present.

A possible embodiment for freezing the video images based on MBA stuffing is shown in FIG. 2. Reference numerals which are the same in FIG. 2 as in FIG. 1 relate to the same elements.

In the embodiment according to FIG. 2 the video freeze control 2 comprises a detector 8 which is coupled to input 2g to which the video signal VID is fed. An output of the detector 8 is connected to a delay element 10, which delays the output signal from detector 8 by a predetermined number—for example 26—of bits. An output of the delay element 10 is connected to a video control unit 11. The video control unit 11 also has an output which is connected to the output 2f for supplying the video stop signal VS, an output which is connected to the output 2e for supplying a video start stuffing signal VIDSTST and an output which is connected to the output 2b for supplying the video control signal VSC. The video control unit 11 is also provided with an input which is connected to input 2d for receiving a video end stuffing signal VIDENDST and an input which is connected to input 2a for receiving the freeze command signal FR.

The video freeze control 2 is additionally equipped with a delay element 9, an input of which is coupled to input 2g for receiving the video signal VID. An output of the delay element 9 is coupled to an input B of the video switch 4. The video signal VID is also directly available at an input A of the video switch 4, whilst the video stuffing signal VIDSTUFF is available at an input C of video switch 4.

The video output signal VO available at the output of the video switch 4 is fed to an error correction generator 12, which provides the video output signal VO with an error correction code, for example a BCH error correction code. Via an output, the error correction generator 12 supplies a video output signal VO' provided with an error correction code, which signal can be transmitted to various receivers (not shown).

The installation according to FIG. 2 functions as follows. The detector 8 is, for example, equipped to detect the "group of block" start code of a video image. A start code of this type consists, In the conventional manner, of twenty bits, sixteen of which are fixed and four of which indicate the number. Each video image is provided with a number of such start codes. Each time the detector 8 has detected such a start code, the detector transmits a relevant warning signal VIDHIT to the delay element 10. The delay element 10 passes on this signal with a delay to the video control unit 11. If the video control unit 11 receives both the delayed signal VIDHIT and the freeze command signal FR, the video control unit 11 generates an associated video control signal VSC for the video switch 4. The video switch 4 then switches the output thereof over from the input A to the input C, so that the video stuffing signal VIDSTUFF will be present at the output thereof. At the same time the video control unit 11 generates a suitable video stop signal VS, which ensures that reading of the video signal VID from the memory 1 is stopped. This situation is maintained for as long as the freeze command signal FR is received.

As soon as the freeze command signal FR is interrupted, the video control unit 11 changes the content of the video stop signal VS and the video control signal VSC in such a way that reading of the video signal VID from the memory 1 is started again, and the video switch 4 reconnects the output thereof to the input A, so that from that point in time the video signal VID will again be available at the output of video switch 4.

In some applications the video stuffing signal VIDSTUFF can consist of a simple series of logic ones or logic zeroes. In other applications, however, a video stuffing signal of this type consists of a predetermined series of bits. In this latter case use must be made of a sort of handshake between the video control unit 11 and the video stuffing generator 3. In that case as soon as the video control unit 11 has received both the delayed sisal VIDHIT and the freeze command signal FR, the video control unit 11 will transmit a video start stuffing signal VIDSTST via output 2e to the video stuffing generator 3 as an indication that the video stuffing generator 3 can start to generate successive series of video stuffing signals VIDSTUFF. At each point in time that such a predetermined series terminates and another new series starts, the video stuffing generator 3 transmits a video end stuffing signal VIDENDST to the video control unit 11. When a freeze command signal FR is interrupted, the video control unit 11 will wait until such a video end stuffing signal VIDENDST is present and only then will change the video control signal VSC, so that it is only then that the video switch 4 will switch over from input C to input A, so that the video stuffing signal will be interrupted only at a well defined point in time between successive series. It is also only then that the video control unit 11 will change the content of video stop signal VS in such a way that reading of the video signal VID from memory 1 is resumed.

The delay element 9 is provided with a memory in which the said "group of block" start code is saved for the video image which has been interrupted. As these data are needed for the video image that is transmitted, the video switch 4 is preferably equipped to switch from input C to input A only via input B, so that before the image data for the subsequent video image are transmitted the start code data read from the memory of delay element 9 are first made available at the output of the video switch 4. However, this is not essential. As an alternative, provision can be made for a video image to be read completely again from the start, i.e. including the start code, when reading of said video image is restarted.

In general, the audio signal AUD will have been coded in accordance with a specific standard. Standards which are widely used are G.711, G.722 and G.728. In the case of standard G.711 the audio signal AUD is byte-aligned, that is to say grouped in groups of in each case eight (or seven) bits. In the case of standard G.722 information is transmitted with each sample indicating the difference between said sample and the previous sample. In principle, the audio information according to this standard is not byte-aligned. However, it is possible using a simple measure to ensure that this is the case, as will be known to those skilled in the art. In the standard G.728 the audio information in the audio signal AUD is not byte-aligned. However, it is then also possible, using fixed markers already present, to make a clear differentiation between successive blocks of audio information in the audio signal AUD.

FIG. 3 shows an example of an implementation of audio freeze means 5, 6 and 7 for audio information according to the standard G.711. The embodiment shown is also applicable to audio information according to the standard G.722 if the length of the audio words, which depends on the mode in which a terminal is used, is known.

The audio freeze control 5 according to FIG. 3 comprises an audio detector 13, an input of which is connected to the input 5g for receiving the audio signal AUD. The audio detector 13 in a simple counter which is capable of counting 8 successive bits. Each time the audio detector 13 has counted eight successive bits, it transmits an output signal AUDHIT to indicate that there is a suitable point in time for interrupting reading of the audio signal. Said output signal AUDHIT is fed to an audio control unit 14, which is also provided with an input which is connected to input 5a for receiving the freeze command signal FR, an input which is connected to input 5d for receiving an audio end stuffing signal AUDENDST and, preferably, an input 5h for receiving the video end stuffing signal VIDENDST from the video stuffing generator 3 (FIG. 2). The audio control unit 14 is further provided with an output which is connected to output 5f for supplying the audio stop signal AS, an output which is connected to output 5b for supplying the audio control signal ASC and an output which is connected to output 5e for supplying an audio start stuffing signal AUDSTST.

Audio switch 7 is provided with an input E for receiving the audio signal AUD, an input D for receiving the audio stuffing signal AUDSTUFF, an input for receiving the audio control signal ASC and an output for supplying an audio output signal AO.

In the case where the audio information is subdivided in accordance with standard G.728. the detector 13 will not be able to be a counter which counts eight successive bits. However, this does not change the principle of the circuit according to FIG. 3.

The installation according to FIG. 3 functions as follows.

As soon as the audio control unit 14 receives both the signal AUDHIT and the freeze command signal FR, it generates the audio control signal ASC and the audio stop signal AS. The audio control signal ASC has the effect that the audio switch 7 connects the output thereof to the input D, so that the audio stuffing signal AUDSTUFF becomes available at the output thereof. The audio stop signal AS has the effect that reading of the audio signal AUD is stopped. As a result of the use of the audio detector 13, this takes place at a well defined point in time.

The audio stuffing signal AUDSTUFF can consist entirely of zeroes or ones, but in some applications this signal can also consist of a consecutive series of predetermined bit patterns, which signal may be interrupted only between two successive series. In that case the audio stuffing generator 6 is connected via a bidirectional communication line to the audio control unit 14. In that case, as soon as a freeze command signal FR is received an audio start stuffing signal AUDSTST is also generated, which signal is transmitted to the audio stuffing generator 6. The audio stuffing generator 6 then starts to generate the predetermined series of bit patterns for the audio stuffing signal AUDSTUFF. As soon as the freeze command signal FR is then interrupted, the audio control unit 14 will again give the audio switch 7 the command to switch over from input D to input E only an soon as the audio control unit 14 has received the audio end stuffing signal AUDENDST from the audio stuffing generator 6, to indicate that a suitable point in time has arrived for interruption of the audio stuffing signal AUDSTUFF. Only then does the audio switch 7 switch over to input E. It is also only at that point in time that the content of the audio stop signal AS is changed in such a way that the audio signal AUD is again read from memory 1 and is available at input E of audio switch 7.

Because, as has been stated, the video images and the audio information are frequently allocated in different blocks, asynchronism between the audio signal AUD and the video signal VID can have occurred after freezing of an image. In theory it in conceivable that said asynchronism leads to the video images and the audio information having become so asynchronous that it becomes annoying to a user. However, this effect can be largely reduced by means of a simple preventive measure. Said preventive measure consists in feeding the video end stuffing signal VIDENDST to the audio control unit 14 via input 5h, as shown in FIG. 3. In this embodiment the audio control unit 14 is equipped such that, after interruption of an active freeze command signal FR, an audio control signal ASC is transmitted to the audio switch 7 for switching over the output thereof from input D to input E only after the audio control unit 14 has received the video end stuffing signal VIDENDST and, thereafter, the audio end stuffing signal AUDENDST. In an embodiment of this type the video section, as shown in FIG. 2, is thus the "master" of the entire freeze process. If the audio information has been subdivided in accordance with the standard G.711, a maximum delay of 7 bits/64 kbit per second=1 millisecond will be produced in this latter embodiment. Such a delay in the audio signal AUD with respect to the video signal VID is not detectable to a user. It is true that in the case of successive freeze command signals (that is to say if a user freezes an image various times in succession) said introduced delays are added together, but a delay between the audio signal AUD and the video signal VID becomes annoying only if this delay is more than about 200 milliseconds. In practice, such a limit will be reached only under very exceptional circumstances.

Although FIGS. 1, 2 and 3 are shown in the form of block diagrams, which can be implemented using simple electronic components, it is self-evident that the invention is not restricted to a hardware implementation and that a complete software implementation, or a part hardware and part software implementation, also falls within the scope of the invention.

FIG. 4 shows an alternative installation for the installation according to FIG. 2. The installation according to FIG. 4 is based on BCH stuffing, as indicated above. Reference numerals and symbols in FIG. 4 which are the same as those in FIG. 2 relate to the same elements. The difference between the installation shown in FIG. 4 and that shown in FIG. 2 is that the video streams are not saved in the memory 1 in the form of "bald" information, as is the case in FIG. 2, but are saved including an error correction code. This is effected with the aid of BCH code, the frame bits of which—1 bit per frame of, for example, 512 bits—can be arbitrarily chosen because they are generated on-line. In the case of video telephones the use of a BCH error correction is, for example, obligatory (standard H.320 or H.261). The frame bits of the BCH error code can advantageously be used to detect a suitable point in time for interruption of the video stream.

In the installation according to FIG. 4, detection of a suitable point in time for interruption of a video stream is effected with the aid of a bit counter 15, which receives a STARTVIDREAD signal from the memory 1. A READ-PULS signal indicates each read pass of the video information from the memory 1. The bit counter 15 increments its contents by one on every read pass and operates, for example, in modulo 512. The bit counter 15 has two outputs ZERO and ONE. The ONE output is connected to an input of a BCH frame counter 16. The ZERO output is connected to both the video control unit 11 and a controllable switch 17. The ZERO signal is active when the counter 15 is at zero, whilst the ONE signal is active when the counter 15 is on one.

The controllable switch 17 receives an output signal FRAMEBIT from the BCH frame counter at a first input and the output signal VO from the controllable switch 4 at a second input. The controllable switch 17 itself supplies an output signal FRAMEVID.

Each time reading of a video stream from the memory 1 is started, which is indicated by STARTVIDREAD, the counter 15 is reset to zero. This also applies for the BCH frame counter 16. If no freeze command signal FR is present, the video signal VID arrives via switch 4 virtually without delay at the switch 17. If the first bit of a BCH frame is received, ZERO becomes active and, under the influence thereof, the switch 17 switches its output through to the input at which the output signal FRAMEBIT from the frame bit counter 16 is received. The signal FRAMEBIT follows a fixed pattern, for example the sequence 0 0 0 0 1 1 0 1 1, and jumps to the following value in this pattern after every BCH frame that Is to say every time that ONE is active. This can be effected with the aid of a simple state machine. As long as ZERO is not active, the switch 17 connects its output through to the input at which the signal VO from the switch 4 is received. The result is that the output of the switch 17 supplies the BCH-corrected video signal FRAMEDVID supplemented with correct frame bits.

When the freeze command signal FR becomes active, the switch 4 in the installation according to FIG. 4 switches to the video stuffing signal VIDSTUFF in the same way as in the installation according to FIG. 2, the signal ZERO having the same function as the signal VIDHIT in the installation according to FIG. 2. After a freeze command signal FR has been received and after said signal has disappeared again, the switch 4 switches back to input A at which the video signal VID is received. In the embodiment according to FIG. 4 the input B at the switch 4 is omitted.

Because in the embodiment according to FIG. 4 all information is usually saved in blocks of 512 bits (a multiple of 8), it is very simple to achieve a software implementation which reads the data byte-wise and inserts a block of 64 stuff bytes after multiples of 64 bytes. In an implementation of this type the first bit of the first stuff byte which is transmitted is, of course, adapted in a manner similar to that effected via the signal FRAMEBIT in the hardware embodiment according to FIG. 4.

A hardware installation which is organized byte-wise, that is to any 8 bits wide, is also possible as an alternative to the installation according to FIG. 4. Other variants are also conceivable.

We claim:

1. An installation for freezing an audiovisual data stream, comprising means (3) for generating a video stuffing signal (VIDSTUFF) and a video freeze control (2) provided with at least a first video input (2a) for receiving a freeze command signal (FR) and with a video output (2f) for supplying a video stop signal (VS) to stop the reading of a video signal (VID) from a memory (1) at a predetermined point in time, after the freeze command signal (FR) has been received, said video freeze control (2) being provided with means (8; 15) to detect predetermined markers in said video signal (VID) and to supply a corresponding video control signal (VSC) whenever such a marker has been detected, and by controllable video switching means (4) provided with at least a first video switch input (C) for receiving the video stuffing signal (VIDSTUFF), a second video switch input (A) for receiving the video signal (VID) read from the memory (1), a video control input for receiving the said video control signal (VSC) and a video switch output for supplying a video output signal (VO), which video switching means (4) are equipped to connect the video switch output to either the first (C) video switch input or the second video switch input (A) depending on the video control signal (VSC).

2. An installation according to claim 1, wherein the video signal (VID) is compiled as a serial bit stream and the video freeze control (2) is also provided with:
a second video input (2g) for receiving the video signal (VID) compiled as a serial bit stream, a video detector (8) connected to the second video input (2g) for detecting said markers as predetermined video bit patterns in the video signal (VID) and supplying a video detector output signal (VIDHIT) after any of said video patterns has been detected, and
a video control unit (11) equipped to receive the freeze command signal (FR) and the video detector output signal (VIDHIT) and to supply the video control signal (VSC) depending on the freeze command signal (FR) and the video detector output signal (VIDHIT).

3. An installation according to claim 2, wherein the video freeze control (2) is also provided with a first delay element (10) provided with a delay element input for receiving the detector output signal (VIDHIT) and with a delay element output for supplying a delayed detector output signal (VIDHIT) to the video control unit (11).

4. An installation according to claim 2, wherein the video freeze control (2) is also provided with a second delay element (9) which is connected to the second video input (2g) for receiving the video signal (VID) and is equipped to supply a delayed video signal, and the video switching means (4) are provided with a third video switch input (B) for receiving the delayed video signal and are equipped for connecting the video switch output to either the first (C), second (A) or third (B) video switch input, depending on the video control signal (VSC).

5. An installation according to claim 1, also comprising an error correction generator (12) which is connected to the video switch output and is equipped to add an error correction code to the video output signal (VO) from the video switching means (4).

6. An installation according to claim 1, wherein the means (3) for generating a video stuffing signal (VIDSTUFF) are connected via a bidirectional video data link to the video freeze control (2) for receiving a video start stuffing signal (VIDSTST) at the point in time when the video stuffing signal has to be generated, and for transmitting a video end stuffing signal (VIDENDST) at the point in time when the video stuffing signal can be interrupted.

7. An installation according to claim 1, further comprising audio freeze means (5, 6, 7) for generating an audio stop signal (AS) in synchronisation with the video stop signal (VS).

8. An installation according to claim 7, wherein the audio freeze means comprise:

an audio freeze control (5) provided with a first audio input (5a) for receiving the freeze command signal (FR), at least a first audio output (5b) for supplying an audio control signal (ASC), a second audio output (5f) for supplying an audio stop signal (AS) to stop the reading of an audio signal (AUD) from the memory (1) at a predetermined point in time, after the freeze command signal (FR) has been received;

means (6) for generating an audio stuffing signal (AUDSTUFF);

controllable audio switching means (7) provided with at least a first audio switch input (D) for receiving the audio stuffing signal (AUDSTUFF), a second audio switch input (E) for receiving the audio signal (AUD) read from the memory (1), an audio control input for receiving the said audio control signal (ASC) and an audio switch output for supplying an audio output signal (AO), which audio switching means are equipped to connect the audio switch output to the first (D) or second (E) audio switch input depending on the audio control signal (ASC).

9. An installation according to claim 8, wherein the audio signal (AUD) is compiled as a serial bit stream and the audio freeze control (5) is also provided with:

a second audio input (5g) for receiving the audio signal (AUD) compiled as a serial bit stream, an audio detector (13) connected to the second audio input (5g) for detecting a predetermined audio bit pattern in the audio signal (AUD) and supplying an audio detector output signal (AUDHIT) after said audio bit pattern has been detected, and an audio control unit (14) equipped to receive the freeze command signal (FR) and the audio detector output signal (AUDHIT) and to supply the audio control signal (ASC) depending on the freeze command signal (FR) and the audio detector output signal (AUDHIT).

10. An installation according to claim 9, wherein the audio detector is a 7-bit counter (13).

11. An installation according to claim 8, wherein the means (6) for generating an audio stuffing signal (AUDSTUFF) are connected via a bidirectional audio data link to the audio freeze control (5) for receiving an audio start stuffing signal (AUDSTST) at the point in time when the audio stuffing signal has to be generated, and for transmitting an audio end stuffing signal (AUDENDST) at the point in time when the audio stuffing signal no longer has to be generated.

12. An installation according to claim 8, wherein the audio freeze control (5) is further provided with a third audio input (5h) for receiving a synchronisation signal (VIDENDSTUFF) generated by the means (3) for generating a video stuffing signal for synchronisation of the generation of the video stop signal (VS) and the audio stop signal (AS).

13. An installation according to claim 1, wherein the video signal (VID) is saved in the memory (1) as a serial bit stream with BCH error correction code and wherein said means to detect predetermined markers in said video signal (VID) comprise a bit counter (15) connected to the memory (1) for supplying a detection signal (ZERO) when a new BCH frame is read, and a video control unit (11) equipped to receive the freeze command signal (FR) and the detection signal (ZERO), to supply the video control signal (VSC) depending on the freeze command signal (FR) and the detection signal (ZERO).

14. A method for freezing an audiovisual data stream comprising at least a video signal (VID) read from a memory (1), comprising the following steps:

a. generation of a freeze command signal (FR);

b. stopping reading of the video signal (VID) from the memory (1) in dependence on said freeze command signal (FR) and supplying a video stuffing signal (VIDSTUFF) from that point in time;

wherein step b comprises the following sub-steps:

b1. detection of a predetermined marker in a video signal (VID) read from a memory (1);

b2. supply of a video detector output signal (VIDHIT; ZERO) as soon as said marker has been detected;

b3. stopping reading of the video signal (VID) from the memory (1) as soon as both the freeze command signal (FR) and the video detector output signal (VIDHIT; ZERO) have been generated and generation of a video stuffing signal (VIDSTUFF) from that point in time.

15. A method for freezing an audiovisual data stream according to claim 14, further comprising the following steps:

c. detection of a predetermined audio bit pattern in an audio signal (AUD) read from the memory (1), after the freeze command signal (FR) has been generated in step a;

d. supply of an audio detector output signal (AUDHIT) as soon as said audio bit pattern has been detected;

e. stopping the reading of the audio signal (AUD) from the memory (1) as soon as both the freeze command signal and the audio detector output signal have been generated and generation of an audio stuffing signal (AUDSTUFF) from that point in time.

* * * * *